United States Patent [19]

Brachtl et al.

[11] Patent Number: 4,755,940

[45] Date of Patent: Jul. 5, 1988

[54] TRANSACTION SECURITY SYSTEM

[75] Inventors: Bruno Brachtl, Herrenberg, Fed. Rep. of Germany; Christopher J. Holloway, London, United Kingdom; Richard E. Lennon, Saugerties, N.Y.; Stephen M. Matyas, Kingston, N.Y.; Carl H. Meyer, Kingston, N.Y.; Jonathan Oseas, Hurley, N.Y.

[73] Assignee: International Business Machines Corporation, Armonk, N.Y.

[21] Appl. No.: 4,817

[22] Filed: Jan. 6, 1987

Related U.S. Application Data

[63] Continuation of Ser. No. 649,442, Sep. 11, 1984, abandoned.

[30] Foreign Application Priority Data

Sep. 17, 1983 [GB] United Kingdom ............... 8324916

[51] Int. Cl.⁴ .......................... H04L 9/02; G07F 7/10
[52] U.S. Cl. .................................... 364/408; 235/382; 340/825.34; 380/24; 380/45; 380/47
[58] Field of Search ... 364/406, 408, 717, 200 MS File, 364/900 MS File; 235/379, 375, 380, 382; 340/825.34; 178/22.08, 22.09, 22.15; 380/24, 45, 47

[56] References Cited

U.S. PATENT DOCUMENTS

| | | | |
|---|---|---|---|
| 4,114,027 | 9/1978 | Slater et al. | 364/408 X |
| 4,224,666 | 9/1980 | Giraud | 235/380 |
| 4,227,253 | 10/1980 | Ehrsam et al. | 364/200 X |
| 4,234,932 | 11/1980 | Gorgens | 364/900 |
| 4,302,810 | 11/1981 | Bouricius et al. | 364/200 |
| 4,310,720 | 1/1982 | Check, Jr. | 178/22.08 |
| 4,317,957 | 3/1982 | Sendrow | 178/22.08 |
| 4,423,287 | 12/1983 | Zeidler | 178/22.08 |
| 4,450,535 | 5/1984 | de Pommery et al. | 364/900 |
| 4,471,216 | 9/1984 | Herve | 235/380 |
| 4,529,870 | 7/1985 | Chaum | 235/380 |
| 4,550,248 | 10/1985 | Hoppe et al. | 235/492 |
| 4,575,621 | 3/1986 | Dreifus | 235/380 |
| 4,630,201 | 12/1986 | White | 364/408 |
| 4,638,120 | 1/1987 | Herve | 380/47 X |

FOREIGN PATENT DOCUMENTS

| | | |
|---|---|---|
| 0018129 | 10/1980 | European Pat. Off. . |
| 0112944 | 7/1984 | European Pat. Off. . |
| 2020513 | 11/1979 | United Kingdom . |
| 0007002 | 1/1980 | United Kingdom . |
| 2060233 | 4/1981 | United Kingdom . |

Primary Examiner—Jerry Smith
Assistant Examiner—Clark A. Jablon
Attorney, Agent, or Firm—Edwin Lester; Frederick D. Poag; John E. Hoel

[57] ABSTRACT

An electronic funds transfer system (EFT) is described in which retail terminals located in stores are connected through a public switched telecommunication system to card issuing agencies data processing centers. Users of the system are issued with intelligent secure bank cards, which include a microprocessor, ROS and RAM stores. The POS includes a personal key (KP) and an account number (PAN) stored on the card when the issuer issues it to the user. Users also have a personal identity number (PIN) which is stored or remembered separately.

A transaction is initiated at a retail terminal when a card is inserted in an EFT module connected to the terminal. A request message including the PAN and a session key (KS) is transmitted to the issuers data processing center. The issuer generates an authentication parameter (TAP) based upon its stored version of KP and PIN and a time variant parameter received from the terminal. The TAP is then returned to the terminal in a response message, and based upon an imputed PIN, partial processing of the input PIN and KP on the card a derived TAP is compared with the received TAP in the terminal. A correct comparison indicating that the entered PIN is valid.

The request message includes the PAN encoded under the KS and KS encoded under a cross-domain key. Message authentication codes (MAC) are attached to each message and the correct reception and regeneration of a MAC on a message including a term encoded under KS indicates that the received KS is valid and that the message originated at a valid terminal or card.

6 Claims, 9 Drawing Sheets

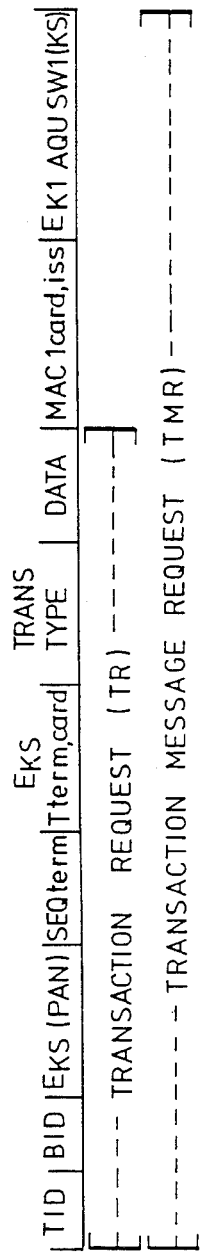
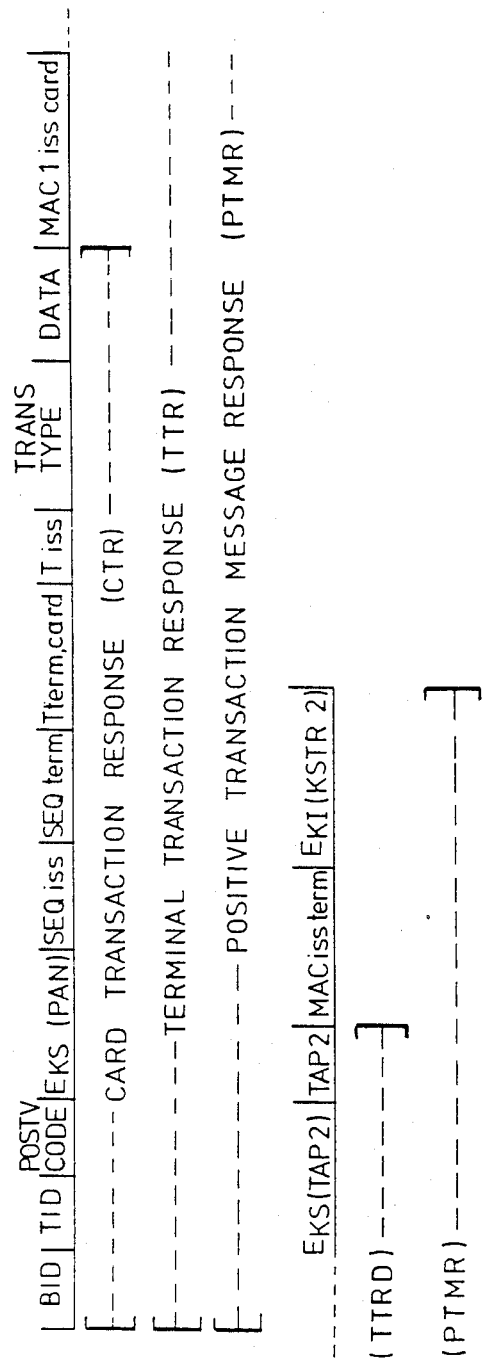

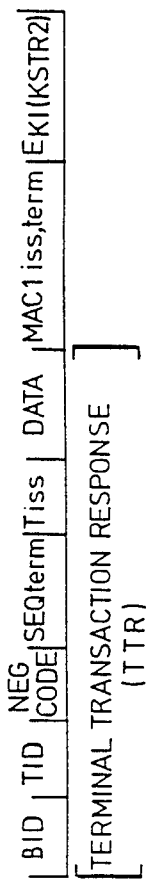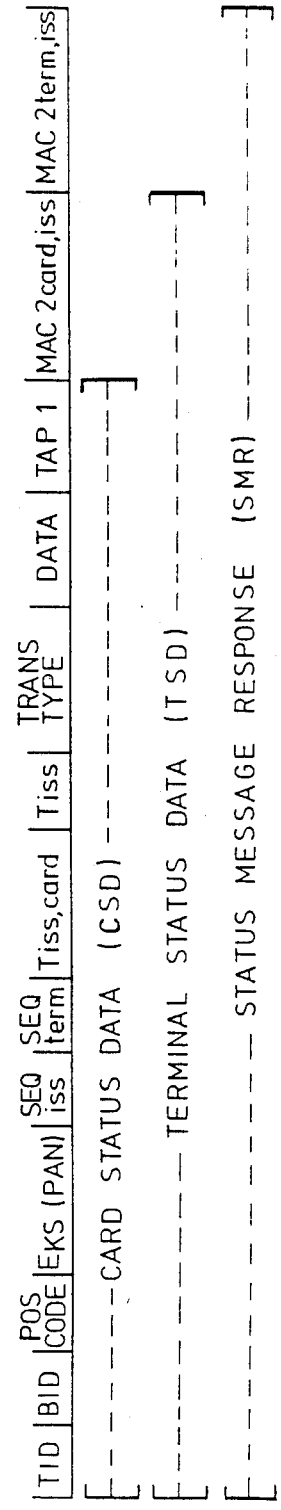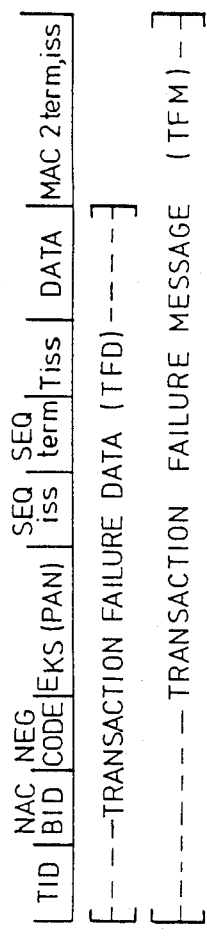

|BID|TID|NEG CODE|SEQterm|Tiss|DATA|MAC1 iss,term|EKI(KSTR2)|

TERMINAL TRANSACTION RESPONSE (TTR)

--- NEGATIVE TRANSACTION MESSAGE RESPONSE (NTMR) ---

FIG. 15  NEGATIVE MESSAGE RESPONSE FORMAT

|TID|BID|POS CODE|EKS(PAN)|SEQ iss|SEQ term|Tiss,card|Tiss|TRANS TYPE|DATA|TAP 1|MAC 2card,iss|MAC 2term,iss|

--- CARD STATUS DATA (CSD) ---

--- TERMINAL STATUS DATA (TSD) ---

--- STATUS MESSAGE RESPONSE (SMR) ---

FIG. 16  TRANSACTION STATUS MESSAGE FORMAT

|TID|NAC BID|NEG CODE|EKS(PAN)|SEQ iss|SEQ term|Tiss|DATA|MAC 2term,iss|

--- TRANSACTION FAILURE DATA (TFD) ---

--- TRANSACTION FAILURE MESSAGE (TFM) ---

FIG. 17  NEGATIVE TRANSACTION STATUS MESSAGE FORMAT

TRANSACTION SECURITY SYSTEM

This application is a continuation of patent application Ser. No. 649,442, filed Sept. 11, 1984, now abandoned.

FIELD OF THE INVENTION

This invention relates generally to point of sale and electronic funds transfer systems and in particular to the personal verification of users of such systems.

Electronic funds transfer (EFT) is the name given to a system of directly debiting and crediting customer and service suppliers' accounts at the instant of confirmation of a transaction. The accounts are held at a bank, or credit card company's central processing system, which is connected to a dedicated network of retailers or service suppliers' data processing equipment. In this way no cash or check processing is required for the transaction.

Point of sale (POS) is the name given to retailers' data processing systems in which check-out or sale point tills are connected directly to a data processing system. Details of current transactions can then be used for stock control, updating customer accounts held locally and monitoring the retailers flow of business A POS terminal can include the function required for an EFT terminal and be connected to an EFT network as well as the local retailers data processing system.

In a simple application each bank or credit card company has its own network and each customer of the bank has a credit card which can only be used on that network, such a network is described in European Patent Publication No. 32193.

BACKGROUND OF THE INVENTION

European Patent Publication No. 32193 (IBM Corporation) describes a system in which each user and retailer has a cryptographic key number—retailer's key Kr and user's key Kp—which is stored together with the user's account number and retailer's business number in a data store at the host central processing unit (cpu). The retailer's key and the user key are used in the encryption of data sent between the retailer's transaction terminal and the host cpu. Obviously only users or customers with their identity numbers and encryption keys stored at the host cpu can make use of the system. As the number of users expands there is an optimum number beyond which the time taken to look up corresponding keys and identity numbers is unacceptable for on-line transaction processing.

The system described is only a single domain and does not involve using a personal identification number (PIN). Verification of the user's identity is at the host and without a PIN there is no bar to users using stolen cards for transactions.

European Patent Publication No. 18129 (Motorola Inc.) describes a method of providing security of data on a communication path. Privacy and security of a dial-up data communications network are provided by means of either a user or terminal identification code together with a primary cipher key. A list of valid identification codes and primary cipher code pairs is maintained at the central processing unit. Identification code and cipher key pairs, sent to the cpu are compared with the stored code pairs. A correct comparison is required before the cpu will accept encoded data sent from the terminal. All data sent over the network is ciphered to prevent unauthorised access using the the relevant user or terminal key.

The system described is a single domain in which all terminal keys (or user keys) must be known at a central host location. Hence, the ideas described in the patent do not address a multi-host environment and thus are not addressing the interchange problem either.

UK Patent Application No. 2,052,513A (Atalla Technovations) describes a method and apparatus which avoids the need for transmitting user-identification information such as a personal identification number (PIN) in the clear from station to station in a network such as described in the two European Patent Publications mentioned above. The PIN is encoded using a randomly generated number at a user station and the encoded PIN and the random number are sent to the processing station. At the processing station a second PIN having generic application is encoded using the received random number and the received encoded PIN and the generic encoded PIN are compared to determine whether the received PIN is valid.

This system does not use a personal key and as a consequence for a sufficiently cryptographically secure system, it is necessary to have a PIN with at least fourteen random characters (four bits each). This is a disadvantage from the human factor point of view as users will have difficulty remembering such a long string of characters and the chances of inputting unintentionally an incorrect string is very large. If a phrase, which a user can easily remember, is employed for a PIN, about 28 characters are required. Although remembering the information is not a problem, inputting such a long string of data still presents a human factors problem.

The EFT system made possible by the systems described in the above patent applications is limited to a single host cpu holding the accounts of all users, both retailers and customers.

An EFT system in which many card issuing organisations (banks, credit card companies, etc.) are connected and many hundreds of retail organisations are connected through switching nodes such as telephone exchanges, brings many more security problems.

PCT publication No. Wo 81/02655 (Marvin Sendrow) describes a multihost, multi-user system in which the PIN is ciphered more than once at the entry terminal. The data required to validate and authorise the transactions is transmitted to a host computer which accesses from its stored data base the data that is required to decipher and validate the transaction, including the ciphered PIN. A secret terminal master key must be maintained at each terminal. A list of these master keys is also maintained at the host computer.

The maintaining of lists of terminal master keys at each of the card issuing organisation's host computers is obviously a difficult task, in a complex system where the terminal keys are not controlled and, therefore, not known by the card issuing host.

European Patent Publication No. 55580 (Honeywell Information Systems) seeks to avoid the necessity of transmitting PIN information in the network by performing PIN verification at the entry point terminal. This is achieved by issuing each user with a card that has encoded in the magnetic stripe the bank identification (BIN), the user's account number (ACCN) and a PIN offset number. The PIN offset is calculated from the PIN, BIN and ACCN. The user enters the PIN at a keyboard attached to the terminal, which also reads the PIN offset, BIN and ACCN from the card. The terminal then recalculates a PIN offset from the user's entered PIN, the BIN and ACCN. If the re-calculated PIN offset is the same as the PIN offset read from the card then verification of the PIN is assumed. This approach has the disadvantage in that the system is not involved in the validation and that knowing that the PIN offset is calculated from the PIN, the BIN and ACCN, anyone having knowledge of the process can manufacture fraudulent cards with valid PINS.

Advances in microcircuit chip technology has now led to the possibility that user cards instead of having user data stored on a magnetic stripe can contain a microprocessor with a read only store (ROS). The microprocessor is activated when the card is placed in an EFT terminal and the appropriate power and data transmission interface connections are made. The microprocessor on the card is controlled by control programs stored in the ROS. The users and issuers identification can also be stored in the ROS together with other information.

Examples of such cards including a microprocessor are shown in Kingdom patent applications Nos. 2,081,644A and 2,095,175A.

European patent application No. 82306989.3 (IBM) describes a method and apparatus for testing the validity of personal identification numbers (PIN) entered at a transaction terminal of an electronic funds transfer network in which the PIN is not directly transmitted through the network. The PIN and the personal account number (PAN) are used to derive an authorisation parameter (DAP). A unique message is sent with the PAN to the host processor where the PAN is used to identify a valid authorisation parameter (VAP). The VAP is used to encode the message and the result (a message authentication code MAC) transmitted back to the transaction terminal. The terminal generates a parallel derived message authentication code (DMAC) by using the DAP to encode the message. The DMAC and MAC are compared and the result of the comparison used to determine the validity of the PIN.

In such a system the generation of DAP as well as VAP is based on a short PIN only and is therefore cryptographically weak. Furthermore, the EFT transaction terminal has access to all the information carried on the identity card which may be regarded as a security weakness in the system. The present invention seeks to overcome such deficiencies by storing personal key data in a portable personal processor carried on a card and only processing the key data on the card.

In any multi-domain communication network where such domain includes a data processor and in which cryptographically secure transmission takes place it is necessary to establish cross domain keys. A communication security system in which cross domain keys are generated and used is described in U.S. Pat. No. 4,227,253 (IBM). The patent describes a communication security system for data transmissions between different domains of a multiple domain communication network where each domain includes a host system and its associated resources of programs and communication terminals. The host systems and communication terminals include data security devices each having a master key which permits a variety of cryptographic operations to be performed. When a host system in one domain wishes to communicate with a host system in another domain, a common session key is established at both host systems to permit cryptographic operations to be performed. This is accomplished by using a mutually agreed upon cross-domain key known by both host systems and does not require each host system to reveal its master key to the other host system. The cross domain key is enciphered under a key encrypting key at the sending host system and under a different key encrypting key at the receiving host system. The sending host system creates an enciphered session key and together with the sending cross-domain key performs a transformation function to re-encipher the session key under the cross domain key for transmission to the receiving host system. At the receiving host system, the receiving host system using the cross domain key and received session key, performs a transformation function to re-encipher the received session key from encipherment under the cross domain key to encipherment under the receiving host system key. With the common session key now available in usable form at both host systems, a communication session is established and cryptographic operations can proceed between the two host systems.

Reference to the following publications are included as giving general background information in encryption techniques and terminology:

1. IBM Technical Disclosure Bulletin, Vol. 19, No. 11, April 1977, p. 4241, "Terminal Master Key Security" by S. M. Matyas and C. H. Meyer.
2. IBM Technical Data Bulletin, Vol. 24, No. 1B, June 1981, pp. 561–565, "Application for Personal Key Crypto With Insecure Terminals" by R. E. Lennon, S. M. Matyas, C. H. Meyer and R. E. Shuck;
3. IBM Technical Data Bulletin, Vol. 24, No. 7B, December 1981, pp. 3906–3909, "Pin Protection/Verification For Electronic Funds Transfer" by R. E. Lennon, S. M. Matyas and C. H. Meyer;
4. IBM Technical Disclosure Bulletin, Vol. 24, No. 12, May 1982, pp. 6504–6509, "Personal Verification and Message Authentication Using Personal Keys" by R. E. Lennon, S. M. Matyas and C. H. Meyer;
5. IBM Technical Disclosure Bulletin, Vol. 25, No. 5, October 1982, pp. 2358–2360, "Authentication With Stored KP and Dynamic PAC" by R. E. Lennon, S. M. Matyas and C. H. Meyer;

SUMMARY OF THE INVENTION

The present invention has the advantage that personal identification number (PIN) checking can be carried out at a terminal remote from a issuer data processing centre without exposing the PIN to the network. This is made possible by using a one-way cipher function to generate the authentication parameter, the components of which include a personal key (KP) and the PIN to be checked.

A one-way function is defined as a function for which there is no way to deduce the parameters used to perform the function. The use of transaction variant parameters generated at the terminal and the issuer for each transaction adds further levels of security to the system. A transaction variant input ensures that an authentication parameter is related to a current transaction and has not been pregenerated in the system and later obtained for potential fraudulent use. The comparison of received and regenerated transaction variant authentication parameters at the terminal also ensures that the correct transaction variant was received at the issuer and sent in the response to the terminal.

According to the invention there is provided a method of testing the validity of personal identification numbers (PIN) entered into an electronic funds transfer system (EFT) at a terminal connected through a data communication network to a data processing centre in which each user of the EFT system has an intelligent secure bank card on which is stored a personal key (KP) and a personal account number (PAN) and the data processing centre holds a master list of PINs and KPs or a logical function of PIN and KP indexed by PANs, the method comprising the following steps:

1. transmitting the PAN from the card through the terminal to the data processing centre,
2. generating at the data processing centre by a one way encipher function at a transaction variant authentication parameter (TAP) directly dependent upon the PIN and the KP,
3. transmitting the TAP to the terminal and storing the TAP at the terminal,
4. receiving from the card user the PIN at the terminal and transmitting the PIN to the card,
5. generating at the card a transaction variant authentication parameter (TAPc) directly dependent upon the entered PIN and the stored KP,
6. transmitting the TAPc from the card to the terminal and at the terminal comparing the TAP received from the data processing centre with the TAPc received from the card, a correct comparison indicating that the entered PIN was valid.

In order that the invention may be fully understood a preferred embodiment thereof will now be described with reference to the accompanying drawings.

BRIEF DESCRIPTION OF THE DRAWINGS

FIGS. 13–17 illustrate the message formats used in the preferred embodiments.

Table of Abbreviations

In the designation of the preferred embodiment, the following abbreviations are used:

AP = authentication parameter (generated from PAN, KP and PIN)
BID = bank or card issuer's identity
KI = interchange key
KP = personal key
KM0 = host master key
KM1 = first variant of host master key
KM2 = second variant of host master key
KM3 = third variant of host master key
KMT = terminal master key
KS = session key
KSTR1 = transaction session key one (randomly or pseudo-randomly generated)
KSTR2 = transaction session key two (generated from Tiss,term,card and KTR1)
KSTR3 = transaction session key three (generated from Tiss,term,card and KTR2)
KTR1 = transaction key one (generated from PAN and KP)
KTR2 = transaction key two (generated from PAN, KP and PIN)
MAC = message authentication code
PAN = primary account number
PIN = user's personal identification number
Tcard = time-variant information generated by bank card
Tiss = time-variant information generated by issuer
Tterm = time-variant information generated by terminal
Tterm,card = time-variant information generated from Tterm and Tcard using a one-way function
Tiss,term,card = time-variant information generated from Tiss and Tterm,card
TAP1 = time-variant authentication parameter (generated from Tterm,card and AP)
TAP2 = time-variant authentication parameter (generated from Tiss,term,card and TAP1)
TID = terminal ID
SEQterm = terminal sequence number
SEQiss = issuer sequence number

PREFERRED EMBODIMENT OF THE INVENTION

Figure 1:
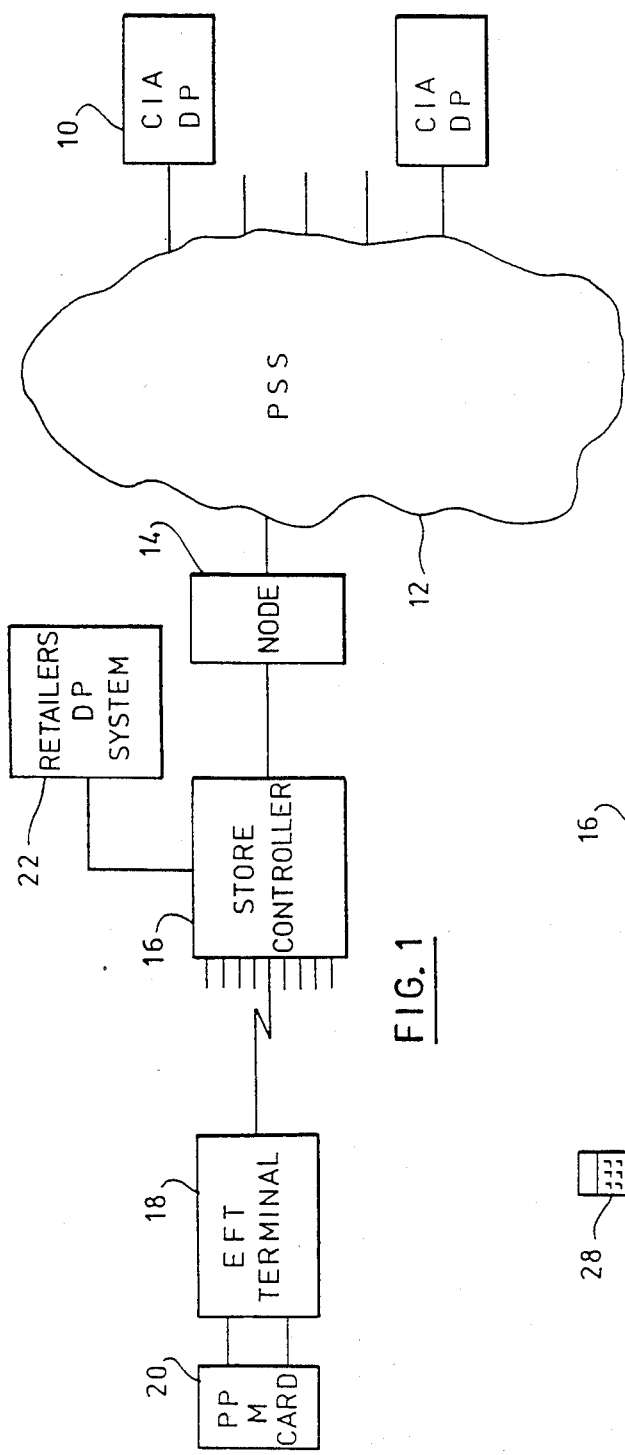
FIG. 1 is a block schematic showing the component parts of an EFT network.

Referring now to FIG. 1 an EFT network is shown in which card issuing agencies' data processing centres 10 are connected through a packet switched communication network 12 through network nodes 14 to retail store controllers 16. Each store controller 16 is connected directly to the store's EFT transaction terminals 18 which have an interface including power and input-output means for communicating with a portable microprocessor 20 contained on a personal identity card issued by one of the card issuing agencies.

The store controller 16 may also be directly connected with the retailers own data processing centre.

Figure 2:
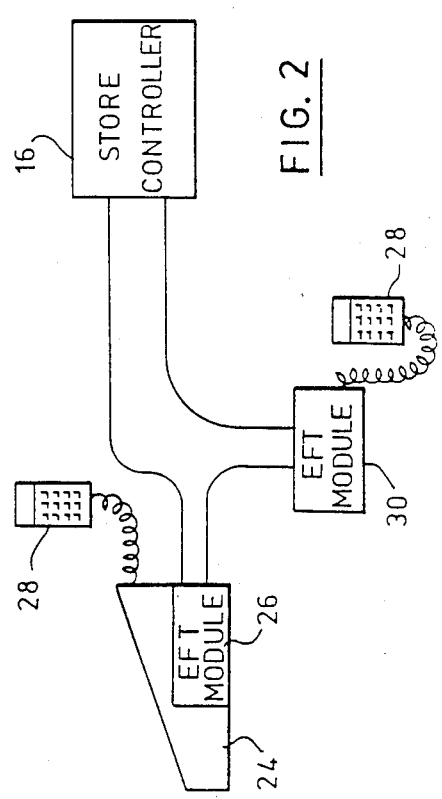
FIG. 2 is a block schematic of the retail store components of the EFT network.

The retail store components of the network are expanded in FIG. 2. The EFT transaction terminal may include a point of sale check-out terminal 24 including an EFT module 26 and having a consumer module 28 connected so that a user can key-in data on the module. The store computers can also include an enquiry station which is an EFT module 30 and consumer module positioned so that users can communicate directly with the card issuing agency asking for example for the current balance or credit limit on their accounts before making a purchase.

The consumer modules 28 are a twelve button key pad with, for example, a liquid crystal display such as are now in common use for other applications, hand calculators, remote TV selectors, etc.

The EFT modules and point of sale terminals each have their own microprocessor and encryption-decryption modules together with read only and random access storage devices. The network nodes have a larger capacity processor such as the IBM Series 1 processing unit, (IBM is a Registered Trade Mark).

In the preferred embodiment of the invention a card issuing agency prepares individual user cards for each user. The cards include a personal portable microprocessor, a read only store (ROS), a random access memory (RAM) and an encryption device. The ROS for each user includes a personal encryption key (KP), a user identity code or personal account number (PAN) and a card issuer's identity code (BID). The KP and PAN, are also stored at the issuing agency's data processing centre together with a personal identification number (PIN). BID is a code that identifies the issuing agency's data processing centre to the EFT network.

Each unit in the network has an identity code which is used for routing messages through the network.

The EFT modules also include a microprocessor, RAM and ROS stores and an encryption device. Depending upon the further encryption techniques employed in the network, the store controllers and packet switched network nodes contain data processing and encryption devices.

When the EFT network is set up in order for secure transmission of transaction messages to take place it is necessary to generate identity numbers and encipherment keys used at the various nodes of the network. These pregenerated quantities are:

AP—generated at card issuing agency; defined as: $E_{PIN \oplus KP}(PAN) \oplus PAN$.

K1—generated at switch; issuer, acquirer

KP—generated at issuing agency;

KM0—generated at issuer, acquirer, switch

KMT—generated at acquirer

KTR1—generated at issuer; defined as: $D_{KP}(PAN) \oplus PAN$

KTR2—genezated at issuer; defined as: $D_{PIN \oplus KP}(PAN+1) \oplus (PAN+1)$

PAN—generated at issuer

PIN—generated at issuer

TID—generated at acquirer

Where $\oplus$ denotes modulo 2 addition and + denotes modulo $2^{64}$ addition.

At initialisation of the system the KP, PIN and PAN quantities are used to generate AP, KTR1 and KTR2, which are unique to each user card. The quantities AP, KTR1 and KTR2 are stored at the issuer's data processing centre enciphered under the second variant (KM2) of the issuer's master key and associated together and enclosed by the PAN for the user. The quantities PAN, PIN and KP for each user are also stored offline for backup purposes (e.g., in a safe or vault) and are erased from main memory once AP, KTR1 and KTR2 have been generated.

For each card, a unique PAN and KP are stored in the cards ROM.

Each user must store separately or remember the unique PIN.

A unique TID and KMT are stored in each terminal and at the associated acquirer.

A unique KM0 for each processing node is stored at that node, i.e., issuer, acquirer and switch.

During the course of a transaction, some of these values and others based upon stored values are generated dynamically at locations in the network.

The FIG. 1 configuration of the system shows a complete organisation in which a large retail outlet has its own "in-store" data processing system. In this case, the retailer's data processing system is regarded as the acquirer and the PSS node as the switch.

In a simpler organisation where a small retailer may have only one terminal connected directly to the PSS node, then the function of the acquirer and switch are combined and there is no cross-domain translation required between acquirer and switch.

The following cryptographic operations are available at the host system of the issuer, acquirer and switch.

Encipher Data (ECPH):

ECPH: $[E_{KM0}K, X_1, X_2, \ldots, X_n] \rightarrow E_K X_1, E_K(X_2 \oplus E_K X_1), \ldots, E_K(X_N \oplus E_K X_{n-1})$ Decipher Data (DCPH):

DCPH: $[E_{KM0}K, Y_1, Y_2, \ldots, Y_n] \rightarrow D_K Y_1, D_K(Y_2) \oplus Y_1, \ldots, D_K(Y_n) \oplus Y_{n-1}$ Set Master Key [SMK]:

SMK: [KM0]Write Cipher Key KM0 in Master Key Storage

Encipher Under Master Key (EMK0):

EMK0: $[K] \rightarrow E_{KM0}(K)$

Re-encipher From Master Key (RFMK):

RFMK: $[E_{KM1}KN, E_{KM0}K] \rightarrow E_{KN}K$

Re-encipher To Master Key (RTMK):

RTMK: $[E_{KM2}KN, E_{KN}K] \rightarrow E_{KM0}K$

Translate Session Key (TRSK):

TRSK: $[E_{KM3}KN), E_{KN1}KS, E_{KM1}KN2] \rightarrow E_{KN2}KS$

European Patent Application No. 821108/49 describes a system for performing the TRSK function.

The following cryptographic operations are available at the terminal:

Load Key Direct (LKD):

LKD: [K]Load Cipher Key K into Working Key Storage

Write Master Key (WMK):

WMK: [KMT]Write Cipher Key KMT In Master Key Storage

Decipher Key (DECK):

DECK: $[E_{KMT}K]$Decipher $E_{KMT}K$ under the terminal master key KMT and load recovered cipher key K into the Working Key Storage Encipher (ENC):

ENC: $[X_1, X_2, \ldots, X_n] \rightarrow E_{KW}X_1, E_{KW}(X_2 \oplus E_{KW}X_1), \ldots, E_{KW}(X_n \oplus E_{KW}X_{n-1})$ Where KW is the current key in the working key storage.

Decipher (DEC):

DEC: $[Y_1, Y_2, \ldots, Y_n] \rightarrow D_{KW}(Y_1), D_{KW}(Y_2) \oplus Y_1, \ldots, D_{KW}(Y_n) \oplus Y_{n-1}$ Where KW is the current key in the working key storage.

Figure 3:
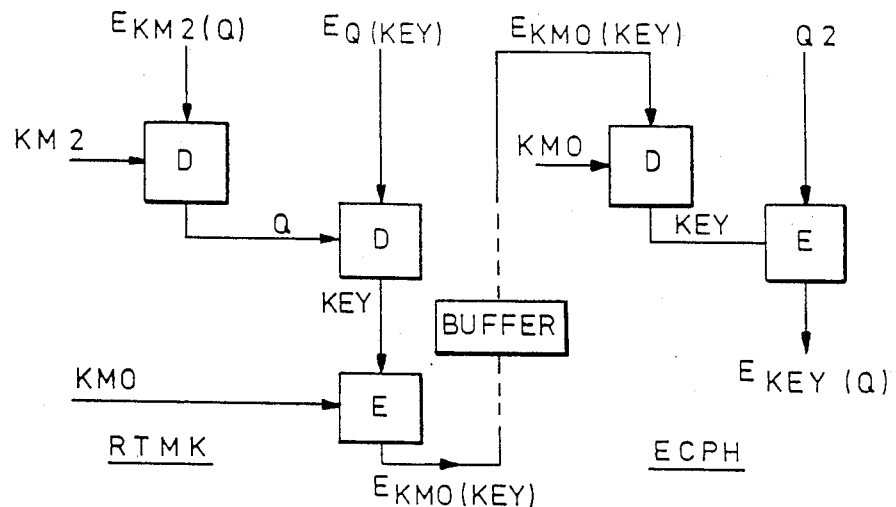
FIGS. 3–9 illustrate enciphering techniques used in the preferred embodiment.

Encipher Data (ECPH): ECPH: $[E_{KMT}K, X_1, X_2, \ldots, X_n] \rightarrow E_K(X_1), E_K(X_2 \oplus E_K(X_1)), \ldots, E_K(X_n \oplus E_K(X_{n-1}))$ Decipher Data (DCPH):

DCPH: $[E_{KMT}(K), Y_1, Y_2, \ldots, Y_n] \rightarrow D_K(Y_1), D_K(Y_2) 3 \oplus Y_1, \ldots, D_K(Y_n) \oplus Y_{n-1}$ At this point is useful to realise that quantities held at the issuer are stored enciphered under the processor master key KM0 or a master key variant KM2. The general decipher-encipher sequence is illustrated in FIG. 3. A sensitive quantity (Q) is held in store encipher under KM2 ($E_{KM2}Q$). The enciphered value is deciphered using KM2 as the key and Q is used as the key to decipher a further variable KEY stored enciphered under key Q ($E_Q$ KEY). The deciphered KEY is then enciphered using the master key KM0 as the key and the result is $E_{KM0}$(KEY). This first operation is called a RTMK function.

To use KEY to encipher a further quantity Q2 then $E_{KM0}$KEY is deciphered using KM0 as the key and the deciphered KEY is used as the key in enciphering Q2 giving $E_{KEY}Q2$. This second operation is called an ECPH function.

These operations all take place in the cryptographically secure hardware circuits (defined cryptographic facility or security module) and consequently while Q and KEY appear in the clear, they are not available outside the secure hardware.

Figure 4:
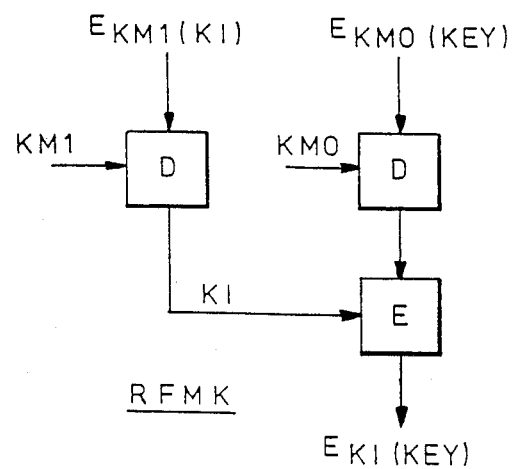

FIG. 4 illustrates the RFMK sequence. A key KI stored enciphered with KM1 as $E_{KM1}$(KI) is deciphered using KM1 as the key recovering KI in the clear. A second key KEY stored under encipherment of KM0 as $E_{KM0}$KEY is deciphered using KM0 as the key. The result of this decipherment (KEY) is then enciphered using KI as the key giving $E_{KI}$KEY.

As part of the system initialisation process, the acquirer (or other node) generates a series of terminal master keys (KMTi) for all the terminals associated with the acquirer system. These keys are protected by being enciphered under the first variant (KM1acq) of the acquirer master key (KM0acq) by an Encipher Master Key function (EMK1) to produce the result set forth by the following notation:

EMK1: [KMTi]→$E_{KM1acq}$KMTi.

The enciphered terminal keys are stored at the acquirer in a cryptographic data set until required for use in a cryptographic operation. Each terminal stores its own KMTi generated by the acquirer in a secure store.

When a session is to be established between the acquirer and a requesting terminal, it is necessary to establish a common session key (KS) between the acquirer and the terminal for secure data communication. Thus, the acquirer causes a pseudo random or random number to be generated which is defined as being the session key enciphered under a secondary file key KNFacq key, i.e., $E_{KNFacq}$KS and is retained at the acquirer for cryptographic operations during the communication session. In order to securely distribute the session key to the requesting terminal, the acquirer performs a transformation function which re-enciphers the session key from encipherment under the acquirer secondary file key to encipherment under the terminal master key, i.e., from $E_{KNFacq}$KS to $E_{KMTi}$KS. This transformation function may be defined by the notation:

TRSK: [$E_{KMH3acq}$KNFacq, $E_{KNFacq}$KS, $E_{KMH1acq}$KMTi]→$E_{KMTi}$KS

Since KS is now enciphered under KMTi, it may be transmitted over the communication line to bind the requesting terminal to the acquirer for a communication session.

When the EFT network is set up and the initialisation is complete, i.e., the pregenerated values are stored at the respective locations, EFT transactions may occur. Each terminal has a sequence number counter which provides SEQterm for each transaction message initiated at that terminal. Each host also has a sequence number counter which provides SEQiss for each transaction message (Mresp) generated at the host data processing centre. These SEQ numbers are provided for audit purposes and do not relate directly to the invention.

The preferred method of testing the validity of messages in the network is as follows:

A transaction is initiated at a POS terminal when a customer's user card is inserted in the EFT module. Insertion of the card couples the power and data bus connections to the personal portable microprocessor (ppm).

At the ppm (20 FIG. 1):

Step C1. Generate Tcard and transfer this variable to the EFT terminal together with card issuer identification (BID), personal account number (PAN). Other information such as credit limit may be passed at this time.

Tcard is a time variant quantity and the method employs a system of time variant quantities in contrast to a universal time reference such as a time-of-day clock. This approach avoids synchronisation problems among the several generators of the desired time-variant information. Each node (ppm (20), EFT terminal (18) and card issuer host (10)) generates its own time variant quantity, Tcard, Tterm and Tiss, respectively. (If desired, time-of-day clock values may be included for auditing purposes.)

At the different nodes time variant quantities are obtained by combining various ones of the three individual quantities using an encipher function.

Figure 5:
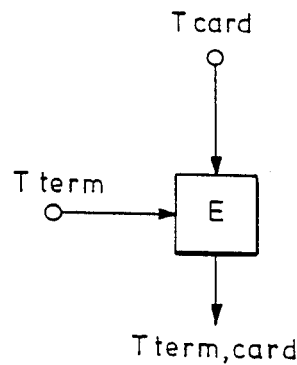

At the EFT terminal (18 FIG. 1):

Step T1. Generate Tterm and the combined Tterm,-card based upon Tcard and Tterm. The generation of Tterm,card is illustrated in FIG. 5. The variable Tcard is ciphered using the variable Tterm as an encryption key. To accomplish this Tterm is loaded as the working key using a Load Key Direct (LKD) operation and then Tcard is enciphered under Tterm using an Encipher (ENC) operation, as follows:

LKD: [Tterm]load Tterm as the working key.
ENC: [Tcard]→$E_{Tterm}$Tcard

The result, i.e., $E_{Tterm}$(Tcard) is referred to as Tterm,-card and stored in the terminals RAM.

Step T2. Receive and store other transaction data (Card issuing agency BID, PAN, etc.)

Step T3. Formulate a message request (Mreq) having a format shown in FIG. 13 which at this time includes the combined time variant data Tterm,card generated at the terminal, the stored card information, TID and other transaction data.

The Mreq is formed in a buffer store portion of the terminals RAM and includes message address information BID.

Step T4. Transfer Mreq and Tterm to the personal portable microprocessor.

At the ppm:

Step C2. Using the received Tterm generate Tterm,-card of reference using the technique shown in FIG. 5.

Step C3. Generate and store a transaction session key (KSTR1) using KP and Tterm,card. KSTR1 is used as the end to end key between the card and the issuer and is generated from PAN and KP read from the card and the card generated (Step T2) Tterm,card.

Figure 6:
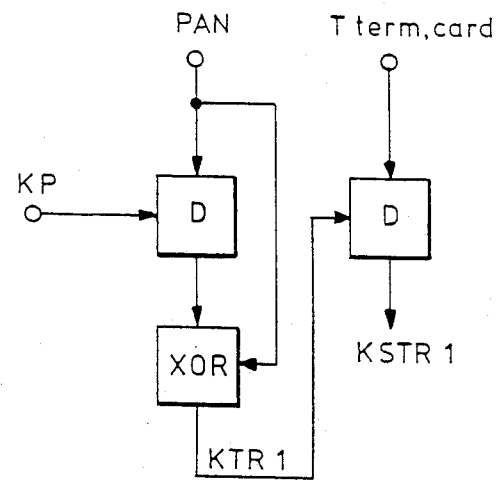

The generation of KSTR1 is illustrated in FIG. 6. Using the user's personal key (KP) as the key the PAN is deciphered and then exclusively OR'd with the result to produce a time invariant transaction key KTR1. Tterm,card is then deciphered using KTR1 as the key to produce the first transaction session key KSTR1.

Step C4. Store in the ppm RAM both KSTR1 and Tterm,card.

Step C5. Compute a message authentication code (MAC1 card,iss,) on the TR portion of Mreq which will include Tterm,card and using KSTR1.

Figure 7:
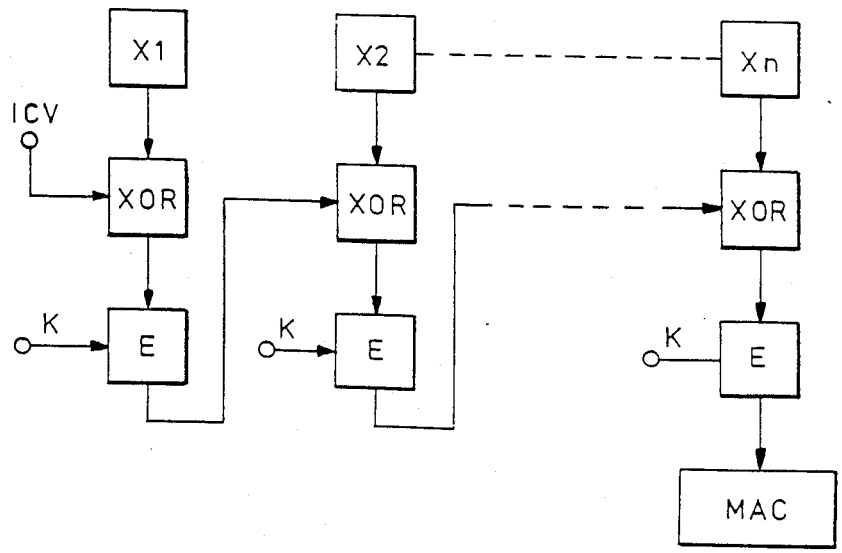

The generation of a message authentication code (MAC), which uses the Encipher Data (ECPH) operation, is illustrated in FIG. 7. The method used is the standard cipher block chaining (CBC) mode of DES. The inputs defined as X1, X2 ... Xn are 64 bit blocks of the request message. The initialising vector ICV is set equal to zero in this process.

The result of the first XOR is then enciphered under the key K. In Step C5 the key K=KSTR1 is used. The second block X2 is then XOR'd with the result of the first encipherment and the output of this XOR is enciphered using key K. This process is continued until Xn is reached and the output or part thereof is defined as the MAC.

Step C6. Transfer the TR portion of Mreq and MAC1card,iss to the EFT terminal.

At the EFT terminal:

Step T5. When the Mreq is received at the terminal, the PAN field of Mreq is enciphered under the session key to meet any system privacy requirements. The enciphered PAN then replaces the clear PAN in the Mreq which may then be transmitted over the communication line to the acquirer for transmission to the issuer data processing centre via the packet switching system PSS (14 FIG. 1). The encipherment of PAN under the session key KS at the terminal may be performed by an Encipher Data (ECPH) operation defined by the following notation:

ECPH: $[E_{KMTi}KS,PAN] \rightarrow E_{KS}PAN$

In executing this operation, a decipher key (DECK) operation is first performed to decipher $E_{KMTi}KS$ under control of KMTi to obtain KS in clear form as the working key after which an Encipher (ENC) operation is performed to encipher PAN under control of KS to derive the enciphered PAN, i.e., $E_{KS}(PAN)$.

The Tterm,card field of Mreq is also enciphered in the same manner using the Encipher Data (ECPH) operation, as follows:

ECPH: $[E_{KMTi}KS, Tterm,card] \rightarrow E_{KS}(Tterm,card)$
and the enciphered Tterm,card replaces the clear Tterm,card in the Mreq.

Step T6. Transmit the received Mreq, MAC1card,iss, to the issuing agency data processing centre via the acquirer system and through a packet switched system node (14 FIG. 1).

At the Node (or Acquirer System):
Identify TID from received Mreq.

Step N1. Using a Translate Session Key (TRSK) operation, together with enciphered key parameters $E_{KM3acq}KNFacq$ and $E_{KM1acq}KIacq,sw$ obtained from the acquirer's cryptographic key data set (CKDS) and the stored enciphered session key $E_{KNFacq}KS$ for the terminal designated by TID, re-encipher KS from encipherment under the secondary file key KNFacq to encipherment under interchange key KIacq,sw (shared with the switch) to produce $E_{KIacq,sw}(KS)$, as follows:

TRSK: $[E_{KM3acq}KNFacq, E_{KNFacq}KS, E_{KM1acq}KIacq,sw] \rightarrow E_{KIacq,sw}KS$ European Patent Application No. 821108/49 describes a system for performing the TRSK function.

Place $E_{KIacq,sw}KS$ in the transaction message request as shown in FIG. 13.

Step N2. Transmit Mreq to the PSS switch.

At the Switch:
Step S1. Extract enciphered session key $EKIacq,sw^{KS}$ from $Mreq$. Using a Translate Session Key (TRSK) operation together with enciphered key parameters $E_{KM3sw}KIacq,sw$ and $E_{KM1sw}KIsw,iss$ obtained from the switch's cryptographic key data set (CKDS) and the received enciphered session key $E_{KIacq,sw}KS$, re-encipher KS from encipherment under KIacq,sw to encipherment under KIsw,iss, as follows:

TRSK: $[E_{KM3sw}KIacq,sw, E_{KIacq,sw}KS, E_{KM1sw}KIsw,iss] \rightarrow E_{KIsw,iss}KS$ This re-enciphered session key, i.e., $E_{KIsw,iss}(KS)$, replaces the previously enciphered session key in Mreq which is then transmitted to the card issuing agency data processing centre.

Step S2. Transmit Mreq from the switch to the issuer.

At the Issuer DP Centre:
Step I1. Receive and store Mreq and index using TID. Extract enciphered session key $E_{KIsw,iss}KS$ from Mreq. Using a Re-encipher to Master Key (RTMK) operation together with enciphered key parameter $E_{KM2iss}(KIsw,iss)$ obtained from the issuer's cryptographic key data set (CKDS) and the received enciphered session key $E_{KIsw,iss}KS$, re-encipher KS from encipherment under KIsw,iss to encipherment under the issuer's host master key (KM0iss), as follows:

RTMK: $[E_{KM2iss}KIsw,iss, E_{KIsw,iss}KS] \rightarrow E_{KM0iss}KS$

Store $E_{KM0iss}KS$ and index using TID. Extract $E_{KS}Tterm,card$ from Mreq, and decipher the enciphered Tterm,card by a Decipher Data (DCPH) operation using the recovered enciphered session key $E_{KM0iss}KS$ to obtain Tterm,card in the clear as follows:

DCPH: $[E_{KM0iss}KS, E_{KS}Tterm,card] \rightarrow Tterm,card$

Replace the enciphered Tterm,card with the clear Tterm,card in Mreq.

Extract $E_{KS}PAN$ from Mreq and store in temporary buffer. Using a Decipher Data (DCPH) operation together with the recovered enciphered session key $E_{KM0iss}KS$, decipher using KS to obtain PAN, as follows:

DCPH: $[E_{KM0iss}KS, E_{KS}(PAN)] \rightarrow PAN$

Step I2. The validity of PAN is checked by a table look-up process using the received deciphered PAN as an index to the table. If the PAN is valid then replace $E_{KS}(PAN)$ with PAN in Mreq and continue at Step I3; otherwise continue at Step I17.

Step I3. Generate and store a pseudo-random or random time-variant quantity Tiss.

Step I4. Using an Encipher Master Key (EMK0) operation, encipher Tiss generated at Step I3 under the issuer's host master key (KM0iss), as follows:

EMK0: $[Tiss] \rightarrow E_{KM0iss}Tiss$

Generate and store the time-variant Tiss,term,card by using an Encipher Data (ECPH) operation together with the enciphered value of Tiss (i.e., $E_{KM0iss}Tiss$) used as a key to encipher Tterm,card received in Mreq to produce $E_{Tiss}(Tterm,card)$, as follows:

ECPH: $[E_{KM0iss}Tiss, Tterm,card] \rightarrow E_{Tiss}Tterm,card$ where the desired Tiss,term,card is defined as quantity $E_{Tiss}(Tterm,card)$.

Step I5. Generate KSTR2 using the RTMK operation of FIG. 3 together with the enciphered key parameter $E_{KM2iss}KNFiss$ obtained from the issuer's CKDS and Tiss,term,card obtained at Step I4 to produce $E_{KM0iss}KSTR2$, as follows:

RTMK: $[E_{KM2iss}(KNFiss), Tiss,term,card] \rightarrow E_{KM0iss}(D_{KNFiss}Tiss, term,card)$ where KSTR2 is defined as $D_{KNFiss}Tiss,term,card$.

Step I6. Generate KSTR1 using the RTMK operation of FIG. 3 together with the enciphered key parameter $E_{KM2iss}KTR1$ for the particular cardholder with personal account number (PAN) obtained from the issuer's CKDS and Tterm,card received in Mreq to produce $E_{KM0iss}KSTR1$, as follows:

RTMK: $[E_{KM2iss}KTR1, Tterm,card] \rightarrow E_{KM0iss}(D_{KTR1}Tterm,card)$ where KSTR1 is defined as $D_{KTR1}Tterm,card$ Step I7. Compute MAC1card,iss of reference on the TR portion of the received Mreq by an Encipher Data (ECPH) operation (described by FIG. 7) using enciphered key parameter $E_{KM0iss}KSTR1$ (obtained at Step I6) as follows:

ECPH: $[E_{KM0iss}KSTR1, TR] \rightarrow MAC1card,iss$ where the last or part of the last block of the resulting ciphertext is defined as MAC1card,iss of reference.

Step I8. If the MAC1card,iss of reference equals the received MAC1card,iss then accept the Mreq and continue at Step I9, otherwise reject Mreq and continue at Step I17.

Note that validating the MAC also simultaneously validates the received session key KS. If KS is changed, the deciphered value of Tterm,card would be in error and the MAC check in turn would fail.

A timeliness check at the issuer is, however, not possible since the issuer at this point has not received time-variant information it can check. (Note that Tterm,card as well as KS were generated outside the issuer and thus the timeliness of these values cannot be checked by the issuer.) This does not present a security weakness because the information the issuer sends out at this point is of no value to an opponent. (Such information is obtainable by an opponent via stale messages sent to the issuer.)

Step I9. If there is no reason to reject Mreq (e.g. funds are available, etc.,) then continue at step I10 otherwise reject Mreq and continue at Step I17.

Step I10. Generate a first time variant authentication parameter (TAP1) using an RTMK operation together with the enciphered authentication parameter $E_{KM2iss}AP$ (for the particular cardholder with personal account number PAN) obtained from the issuer's CKDS and Tterm,card received in Mreq, as follows:

RTMK: $[E_{KM2iss}AP, \text{Tterm,card}] \rightarrow E_{KM0iss}(D_{AP}\text{Tterm,card}) = E_{KM0iss}TAP1$ where TAP1 is defined as $D_{AP}(\text{Tterm,card})$.

Also generate a second time variant authentication parameter (TAP2) using a DCPH operation together with the enciphered TAP1 (i.e., $E_{KM0iss}TAP1$) used as a key parameter and Tiss,term,card obtained at Step I4 to obtain:

DCPH: $[E_{KM0iss}TAP1, \text{Tiss,term,card}] \rightarrow D\text{TAP1Tiss,term,card}$ where TAP2 is defined as $D_{TAP1}\text{Tiss,term,card}$.

TAP1 is defined as $D_{AP}\text{Tterm,card}$ and is obtained using the RTMK function of FIG. 6 where Q is AP (a pregenerated quantity $(E_{KP \oplus PIN}PAN) \oplus PAN$ pregenerated during the initialisation process) and KEY is Tterm,card. The result of the RTMK operation is $E_{KM0}(TAP1)$ as follows:

RTMK: $[E_{KM2iss}AP, \text{Tterm,card}] \rightarrow E_{KM0}TAP1$

TAP2 is defined as $D_{TAP1}\text{Tiss,term,card}$ and is obtained in a DCPH function by deciphering $E_{KM0}TAP1$ under the master key KM0 and then deciphering Tiss,term,card using TAP1 as the key as follows:

DCPH: $[E_{KM0}TAP1, \text{Tiss,term,card}] \rightarrow TAP2$

In summary
$AP = (E_{KP \oplus PIN}PAN) \oplus PAN$
$TAP1 = D_{AP}\text{Tterm,card}$
$TAP2 = D_{TAP1}\text{Tiss,term,card}$ Thus, the correct generation TAP1 and TAP2 are directly dependent upon KP, PIN and PAN.

Step I11. Formulate Mresp as shown in FIG. 14.

Step I12. Compute MAC1iss,card on the card transaction response (CTR) portion of Mresp by an Encipher Data (ECPH) operation (described by FIG. 7) using enciphered key parameter $E_{KM0}KSTR1$ (obtained at Step I6) as follows:

ECPH: $[E_{KM0iss}KSTR1, CTR] \rightarrow MAC1\text{iss,card}$.
where the last or part of the last block of resulting ciphertext is defined as MAC1iss,card.

Step I13. Compute MAC1iss,term on the terminal transaction response TTR) portion of Mresp by an Encipher Data (ECPH) operation (described by FIG. 7) using enciphered key parameter $E_{KM0iss}KSTR2$ (obtained at Step I5) as follows:

ECPH $[E_{KM0iss}KSTR2, TTR] \rightarrow MAC1\text{iss,term}$ where the last or part of the last block of resulting ciphertext is defined as MAC1iss,term.

Transfer MAC1iss,term to Mresp.

Step I14. Re-encipher the transmission session key KSTR2 from encipherment under the issuer's host master key (KM0iss), i.e., $E_{KM0iss}KSTR2$, to encipherment under the interchange key KIiss,sw, i.e., $E_{KIiss,sw}KSTR2$ by a Re-encipher From Master Key (RFMK) operation using the enciphered key parameter $E_{KM1iss}(KIiss,sw)$ obtained from the issuer's CKDS and the stored enciphered transmission key, i.e., $E_{KM0iss}KSTR2$ as follows:

RFMK: $[E_{KM1iss}KIiss,sw, E_{KM0iss}KSTR2] \rightarrow E_{KIiss,sw}KSTR2$

Transfer $E_{KIiss,sw}KSTR2$ to Mresp.

Step I15. Transfer $E_{KS}PAN$ from buffer (Step I1) to Mresp. Where KP is less than a predetermined number of bits then TAP2 is also enciphered under KS using an ECPH function as follows:

ECPH: $[E_{KM0iss}KS, TAP2] \rightarrow E_{KS}TAP2$

Transfer TAP2 or the enciphered TAP2 to Mresp depending on the size of KP.

Step I16. Send to the PSS network. Continue at Step S3.

Step I17. Negative response routine. Formulate Mresp as shown in FIG. 15. The data field will include information on why the transaction is not to be honoured, i.e., lack of funds, MAC check failure, etc. The message will also include Tiss.

Step I18. Compute MAC1iss,term on the TTR portion of the negative Mresp by an Encipher Data (ECPH) operation (described by FIG. 7) using enciphered key parameter $E_{KM0iss}KSTR2$ (obtained at Step I5) as follows:

ECPH: $[E_{KM0iss}KSTR2, TTRD] \rightarrow MAC1\text{iss,term}$
where the last or part of the last block of resulting ciphertext is defined as MAC1iss,term.

Transfer MAC1iss,term to Mresp.

Step I19. Send Mresp to the PSS network. Continue at S3.

At the PSS Switch:

Step S3. Extract enciphered session key $E_{KIsw,iss}KSTR2$ from Mresp. Using a Translate Session Key (TRSK) operation together with enciphered key parameters $E_{KM3sw}KIiss,sw$ and $E_{KM1sw}KIsw,acq$ obtained from the switch's CKDS and the received enciphered session key $E_{KIiss,sw}KSTR2$, re-encipher KSTR2 from encipherment under KIiss,sw to encipherment under KIsw,acq, as follows:

TRSK: $[E_{KM3sw}KIiss,sw, E_{KIiss,sw}KSTR2 \; E_{KM1sw}KIsw,acq] \rightarrow E_{KIsw,acq}KSTR2$ Step S4. Replace $E_{KIiss,sw}(KSTR2)$ with $E_{KIsw,acq}KSTR2$ in Mresp.

Step S5. Send positive or negative to the acquirer as appropriate.

At the Acquirer:

Step N3. Extract enciphered transaction session key $E_{KIsw,acq}KSTR2$ from Mresp. Using a Translate Session Key (TRSK) operation together with enciphered key parameters $E_{KM3acq}KIsw,acq$ and $E_{KM1acq}KMT$ obtained from the acquirer's CKDS, re-encipher KSTR2 from encipherment under KIsw,acq to encipherment under KMT (for the terminal with terminal identifier TID), to produce $E_{KMT}KSTR2$) as follows:

TRSK: $[E_{KM3acq}KIsw,acq, E_{KIsw,acq}KSTR2, E_{KM1acq}KMT] \rightarrow E_{KMT}KSTR2$ Step N4. Replace $E_{KIsw,acq}KSTR2$ with $E_{KMT}KSTR2$ in Mresp.

Step N5. Send positive or negative Mresp to the terminal as appropriate.

At the EFT terminal

Step T7. Check to determine whether the message has been received within a predetermined time period by using a time-out procedure. If the time is not exceeded then proceed to Step T8, else continue at Step T22.

Step T8. Decipher the enciphered PAN, i.e., $E_{KS}$PAN, by a Decipher Data (DCPH) operation using the previously stored enciphered session key $E_{KMT}$KS and $E_{KS}$PAN received in Mresp as follows:
DCPH: [$E_{KMT}$KS, $E_{KS}$PAN]S→PAN Store $E_{KS}$(PAN) in a temporary buffer and replace $E_{KS}$PAN with the deciphered PAN in Mresp.

If TAP2 is in enciphered form, i.e., $E_{KS}$TAP2, then decipher $E_{KS}$TAP2 by a Decipher Data (DCPH) operation using the previously stored $E_{KMT}$KS and $E_{KS}$(TAP2) received in Mresp as follows:
DCPH: [$E_{KMT}$KS, $E_{KS}$TAP2]→TAP2

Step T9. Store $E_{KMT}$KSTR2 in an appropriate buffer.

Step T10. If Mresp is non-negative then go to step T11; otherwise, if negative go to Step T14.

Step T11. Compute MAC1iss,term of reference of the TTR portion of the received Mresp by an Encipher Data (ECPH) operation (described by FIG. 7) using received enciphered key parameter $E_{KMT}$KSTR2 (obtained from Mresp at Step T9) as follows:
ECPH: [$E_{KMT}$KSTR2, TTR]→MAC1iss,term
where the last or part of the last block of resulting ciphertext is defined as MAC1iss,term of reference. If MAC1iss,term of reference equals received MAC1iss,term, then accept received message and go to Step T12; otherwise, go to Step T14.

Step T12. If received Tterm,card equals stored Tterm,card (Step T1), then continue at Step T13; otherwise go to Step T14.

Step T13. Send the CTR and MAC1iss,card portions of Mresp to the personal portable microprocessor (ppm). Go to Step C7.

Step T14. For a negative response message compute MAC1iss,term of reference on the TTRD portion of the received negative Mresp by an Encipher Data (ECPH) operation (described by FIG. 7) using received enciphered key parameter $E_{KMT}$KSTR2 (obtained from Mresp in Step T9) as follows:
ECPH: [$E_{KMT}$KSTR2, TTRD]→MAC1iss,term
where the last or part of the last block of resulting ciphertext is defined as MAC1iss,term of reference. If MAC1iss,term of reference equals received MAC1iss,term then continue at Step T15, else go to Step T16.

Step T15. If received Tterm,card equals stored Tterm,card (Step T1) then abort the transaction and continue at Step T22. (Since a definite negative reply has been received from the issuer, no retry is allowed.) Otherwise, go to Step T16.

Step T16. The timeliness check and/or MAC check failed. Since there is a doubt on the negative or non-negative response the system rules may allow one or more retry. That is a return to Step C1. After a limited number of unsuccessful retries, abort transmission and continue at Step T22.

At the ppm:

Step C7. Receive the CTR and MAC1iss,card portions of Mresp and store Tiss.

Step C8. Compute MAC1iss,card of reference on the CTR portion of the received Mresp using stored key parameter KSTR1 (Step C4) as the enciphering key. Generation of a message authentication code is illustrated in FIG. 7.

Step C9. If MAC1iss,card of reference equals received MAC1iss,card then accept Mresp continue at Step C10; otherwise continue at Step C17.

Step C10. If received Tterm,card equals stored Tterm,card (Step C4) then accept Mresp and continue at Step H1; otherwise, continue at Step C17.

At this point the EFT terminal will display a message indicating to the user that the cardholder is now required to enter the PIN on the terminal consumer module (28 FIG. 2) if there is agreement on transaction details, amount, etc.

At User Cardholder:

Step H1. Enter PIN into card via terminal after agreeing to the transaction details (e.g., amount, etc.). Then continue at Step C11.

At the ppm:

Step C11. Compute TAP1 using PAN, KP, PIN and stored Tterm,card.

The card user's identification PAN is enciphered using an XOR function of KP and the entered PIN as a key. The result of the first encipher operation is XOR'd with PAN defining AP. The stored Tterm,card is then deciphered using AP as the key to produce TAP1.

Step C12. Generate KSTR3 using PAN, KP, PIN and stored PIN and Tiss,term,card.

Figure 8:
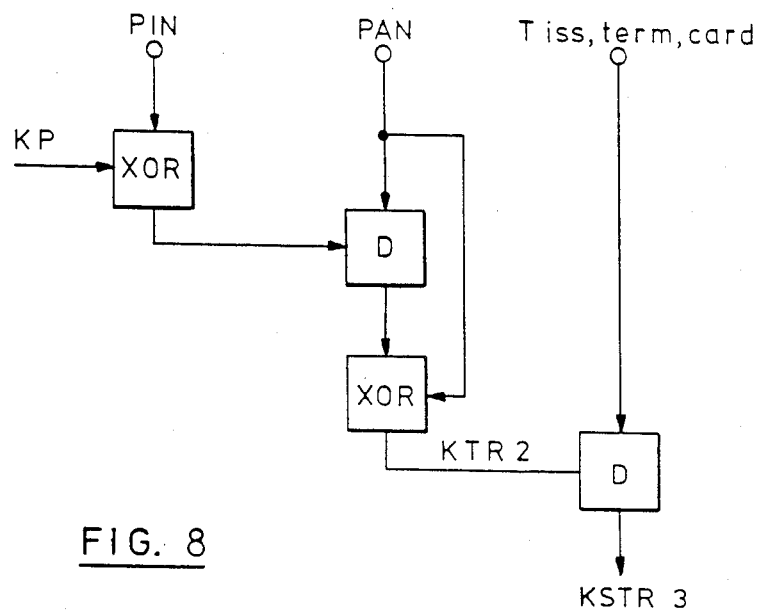

The generation of KSTR3 is illustrated in FIG. 8. The card users identification PAN is deciphered using an XOR function on PIN and KP as the key. The result of the first decipher operation is XOR'd with PAN defining KTR2. Tiss,card,term is then deciphered using KTR2 as the key to produce the transaction session key KSTR3.

Step C13. Store KSTR3 and destroy PIN value.

Step C14. Send TAP1 to terminal.

At the EFT Terminal:

Step T17. Compute Tiss,term,card from stored Tterm,card and issuer received Tiss. Compute TAP2 from Card-received TAP1 and Tiss,term,card.

Figure 9:
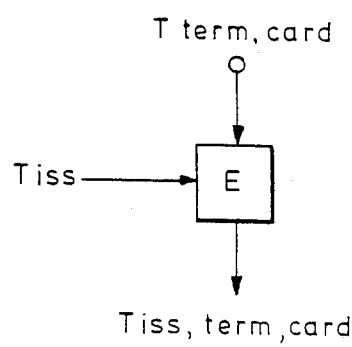

The computation of Tiss,term,card is illustrated in FIG. 9. Tiss received in Mresp is first loaded as a working key using a Load Key Direct (LKD) operation. The stored value of Tterm,card is enciphered under Tiss using an Encipher (ENC) operation to produce $E_{Tiss}$Tterm,card, as follows:
LKD: [Tiss]
ENC: [Tterm,card]→$E_{Tiss}$Tterm,card The computation of TAP2 is accomplished as follows. The cardreceived TAP1 is first loaded as a working key using a Load Key Direct (LKD) operation. The generated value of Tiss,term,card is deciphered under TAP1 using a Decipher (DEC) operation to produce $D_{TAP1}$Tiss,term,card, as follows:
LKD: [TAP1]
DEC: [Tiss,term,card]→$D_{TAP1}$Tiss,term,card
where TAP2 is defined equal to $D_{TAP1}$Tiss,term,card.

Step T18. If TAP2 equals received TAP2 of reference, then accept PIN and continue at Step T19; otherwise if re-entry of the PIN is permitted, as the predetermined number of failed attempts is not exhausted THEN continue at Step H1; ELSE continue at Step T22.

Step T19. Complete the card holder transaction (i.e., hand over goods, print receipt, etc.).

Step T20. IF completion successful THEN continue at Step 21; ELSE continue at Step T22.

Step T21. Formulate a Message status Mstat (reflecting the outcome of the transaction) and send the CSD portion of Mstat to ppm. Continue at C15. The format of the Mstat is shown in FIG. 16.

Step T22. A negative condition has been detected by the terminal (e.g., response timeout, MAC1iss,term check failed, a negative Mresp from issuer due to MAC1card,iss check failure at issuer, printer failure, PIN invalid, etc.).

Step T23. Formulate a negative status message Mstat as shown in FIG. 17 and continue at Step T24. (The code word portion of Mstat indicates whether Mstat represents a positive or negative status message.)

Step T24. Store $E_{KS(PAN)}$ from the Mresp. Compute MAC2term,iss on the TSD portion of Mstat (FIG. 16) or on the TFD portion of the negative Mstat (FIG. 17), as appropriate, by an Encipher Data (ECPH) operations (described by FIG. 7) using enciphered key parameter $E_{KMT}$KSTR2 (obtained from Mresp in Step T9) as follows:

ECPH: $[E_{KMT}$KSTR2, TSD$] \rightarrow$ MAC2term,iss
or
ECPH: $[E_{KMT}$KSTR2, TFD$] \rightarrow$ MAC2term,iss
where the last or part of the last block of resulting ciphertext is defined as MAC2term,iss.

Replace clear PAN with $E_{KS}$PAN. Encipher the received TAP1 (Step T17) by an Encipher Data (ECPH) operation using previously stored enciphered session key $E_{KMT}$KS as follows:
ECPH: $[E_{KMT}$KS, TAP1$] \rightarrow E_{KS}$TAP1

Replace TAP1 with $E_{KX}$TAP1 in Mstat.

Step T25. Send Mstat to issuer via acquirer and switch (MAC2card,iss will be absent in all negative status conditions). Conclude processing at the terminal.

If a Mstat is generated because a MAC check has failed on either a positive or negative Mresp, then a Network Administration Centre processor is informed so that system failures can be monitored and possible faults corrected.

At the ppm:

Step C15. Receive CSD portion of Mstat from terminal. Compute MAC2card,iss on the CSD portion of Mstat using stored key parameter KSTR3 (Step C13) as the enciphering key. Generation of a message authentication code is illustrated in FIG. 7.

Step C16. Send positive response and MAC2card,iss to terminal and continue at Step T24.

Step C17. Send negative response to terminal indicating that MAC check at Step C9 has failed, and continue at Step T23. (A MAC is not calculated here because the check for MAC1iss,card which is end-to-end, failed. Most likely another end-to-end MAC will not be successful either.)

At the Issuer Host:

Step I20. Receive Mstat. If a positive Mstat is received continue at Step I21; otherwise, if a negative Mstat is received continue at Step I31.

Step I21. Process positive Mstat. Extract $E_{KS}$TAP1 as appropriate and $E_{KS}$PAN from positive Mstat and decipher the enciphered TAP1 (as appropriate) and PAN, i.e., $E_{KS}$TAP1 and $E_{KS}$PAN, by a Decipher Data (DCPH) operation using the previously stored enciphered session key $E_{KM0iss}$KS (Step I1) as follows:
DCPH: $[E_{KM0iss}$KS, $E_{KS}$TAP1$] \rightarrow$ TAP1
DCPH: $[E_{KM0iss}$KS, $E_{KS}$PAN$] \rightarrow$ PAN Replace enciphered TAP1 (as appropriate) and PAN with clear TAP1 and PAN in Mstat.

Step I22. Extract Tiss from Mstat and encipher Tiss under the issuer's host master key (KM0iss) by an Encipher Master Key (EMK$\emptyset$) operation as follows:
EMK$\emptyset$: [Tiss]$\rightarrow E_{KM0iss}$Tiss Extract Tterm,card from Mstat, and generate the time-variant Tiss,term,card by an Encipher Data (ECPH) operation using enciphered Tiss, i.e., $E_{KM0iss}$Tiss, as the key, as follows:

ECPH: $[E_{KM0iss}$Tiss, Tterm,card$] \rightarrow E_{Tiss}$Tterm,card
where Tiss,term,card is defined as $E_{Tiss}$Tterm,card.

Step I23. Regenerate KSTR2 by an RTMK operation using enciphered key parameter $E_{KM2iss}$KNFiss obtained from the issuer's CKDS and Tiss,term,card obtained at Step I22 to produce $E_{KM0iss}$KSTR2, as follows:
RTMK: $[E_{KM2iss}$KNFiss, Tiss,term,card$] \rightarrow E_{KM0iss}D_{KNFiss}$Tiss,term,card
where KSTR2 is defined as $D_{KNFiss}$Tiss,term,card.

Step I24. Compute MAC2term,iss of reference on the TSD portion of the received Mstat by an Encipher Data (ECPH) operation (described by FIG. 7) using enciphered key parameter $E_{KM0iss}$KSTR2 (regenerated at Step I23) as follows:
ECPH: $[E_{KM0iss}$KSTR2, TSD$] \rightarrow$ MAC2term,iss
where the last or part of the last block of resulting ciphertext is defined as MAC2term,iss of reference. If computed MAC2term,iss of reference equals MAC2term,iss received in Mstat, then continue at Step I25; otherwise continue at Step I30.

Step I25. If computed Tiss,term,card (Step I22) equals stored Tiss,term,card (Step I4), then continue at Step I26; otherwise, continue at Step I30.

Step I26. Generate KSTR3 by an RTMK operation (FIG. 8) using enciphered key parameter $E_{KM2iss}$KTR2, obtained from the issuer's CKDS for the particular cardholder with personal account number (PAN), and Tiss,term,card generated at Step I23, to produce $E_{KM0iss}$(KSTR3), as follows:
RTMK: $[E_{KM2iss}$KTR2, Tiss,term,card$] \rightarrow E_{KM0iss}D_{KTR2}$Tiss,term,card
where KSTR3 is defined as $D_{KTR2}$Tiss,term,card.

Step I27. Compute MAC2card,iss of reference on the CSD portion of the received Mstat by an Encipher Data (ECPH) operation (described by FIG. 7) using enciphered key parameter $E_{KM0iss}$KSTR3 (generated at Step I26) as follows:
ECPH: $[E_{KM0iss}$KSTR3, CSD$] \rightarrow$ MAC2card,iss
where the last or part of the last block of resulting ciphertext is defined as MAC2card,iss of reference. If computed MAC2card,iss of reference equals MAC2card,iss received in Mstat, then continue at Step I28; otherwise, continue at Step I30.

Step I28. Accept the transaction and update records.

Step I29. Formulate a positive acknowledgement message (Mack) and send Mack to the acquirer system to to the terminal's host. Continue at Step I37.

Step I30. Reject the transaction and initiate a negative acknowlegement message (Mnak) and send Mnak to the terminal and the Network Administration Centre.

Step I31. Process negative Mstat. Regenerate KSTR2 by an RTMK operation using enciphered key parameter $E_{KM2iss}$KNFiss obtained from the issuer's CKDS and stored Tiss,term,card obtained at Step I4 to produce $E_{KM0iss}$KSTR2, as follows:
RTMK: $[E_{KM2iss}$KNFiss, Tiss,term,card$] \rightarrow E_{KM0iss}D_{KNFiss}$Tiss,term,card
where KSTR2 is defined as $D_{KNFiss}$Tiss,term,card Step I32. Compute MAC2term,iss of reference on the TFD portion of the received Mstat by an Encipher Data (ECPH) operation (described by FIG. 7) using enciphered key parameter $E_{KM0iss}$KSTR2 (regenerated at Step I31) as follows:
ECPH: $[E_{KM0iss}$KSTR2, TFD$] \rightarrow$ MAC2term,iss
where the last or part of the last block of resulting ciphertext is defined as MAC2term,iss of reference. If computed MAC2term,iss of reference equals MAC2term,iss received in the negative Mstat, then continue at Step I33: otherwise continue at Step I36.

Step I33. Extract Tiss from the received negative Mstat. If the received Tiss equals stored Tiss (Step I3), then continue at Step I34; otherwise, continue at Step I36.

Step I34. Accept the negative Mstat and update records.

Step I35. Formulate a positive acknowledgment message (Mack) and send Mack to the acquirer system or to the terminal's sponsor host. Continue at Step I37.

Step I36. Reject the negative Mstat and initiate a negative acknowledgement message (Mnak) and send Mnak to the terminal and the Network Administration Centre.

Step I37. Halt procedure.

Figure 10:
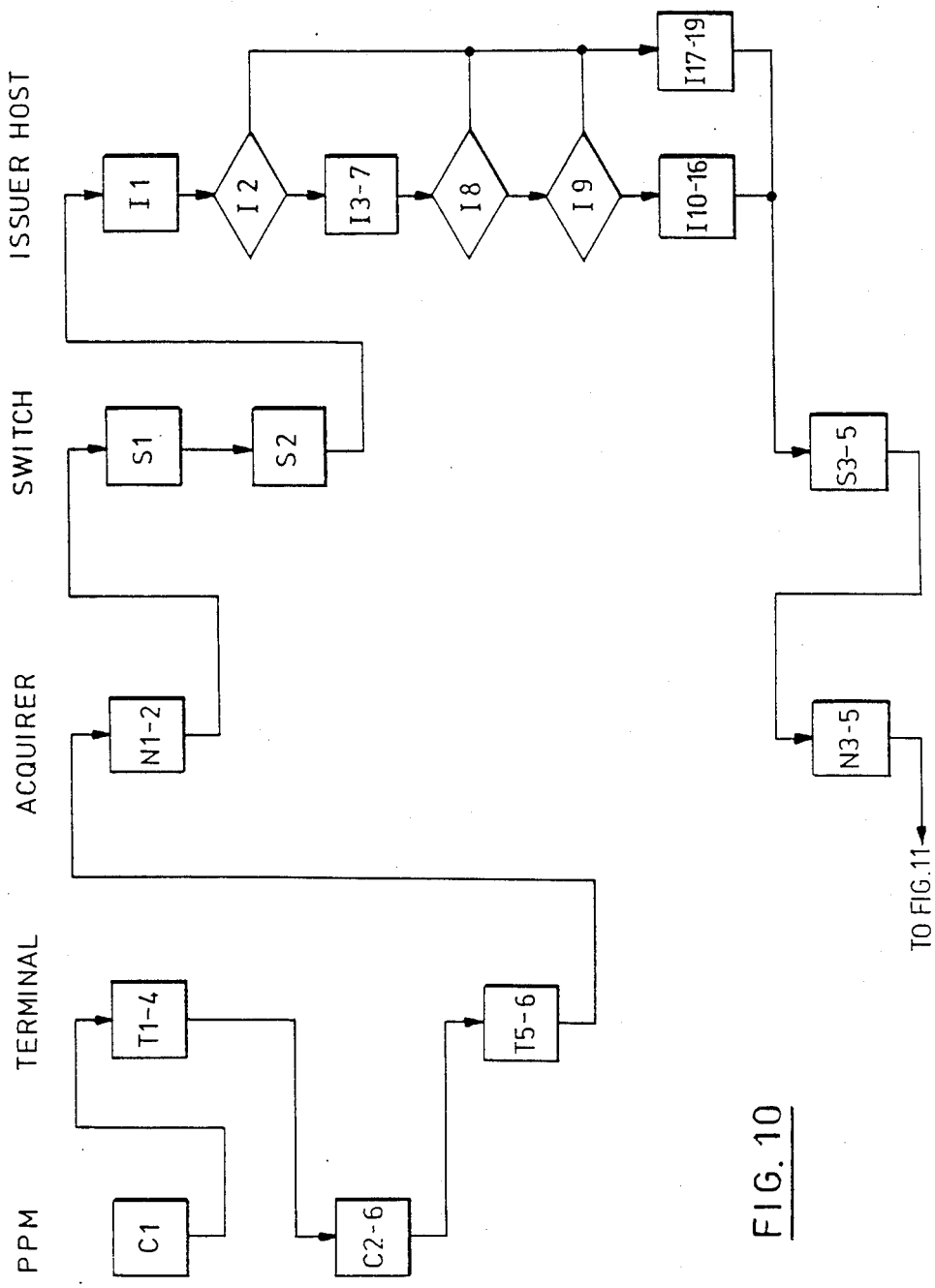
FIGS. 10–12 are flow charts illustrating the steps of the method of the preferred embodiment.
Figure 11:
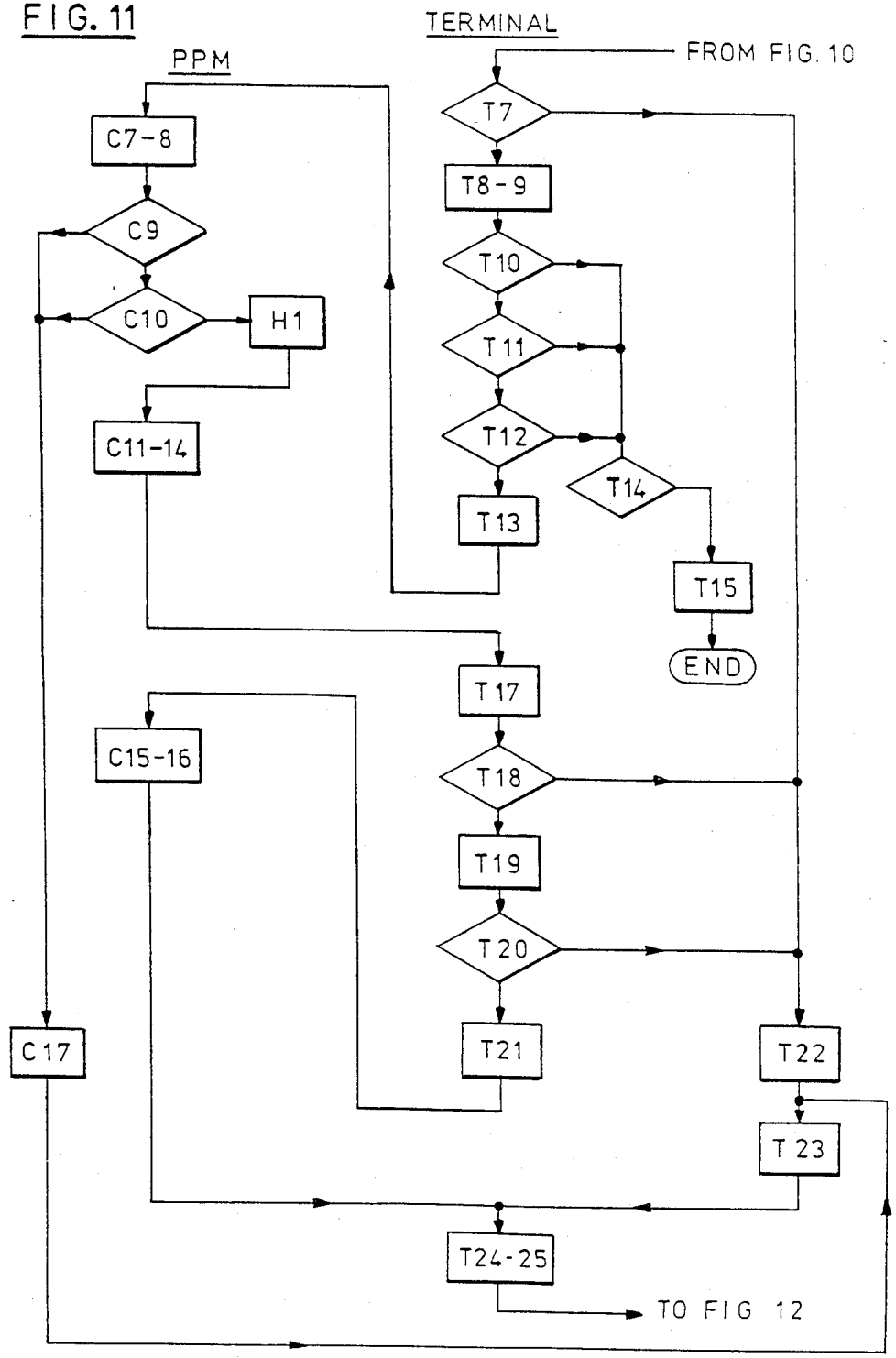
Figure 12:
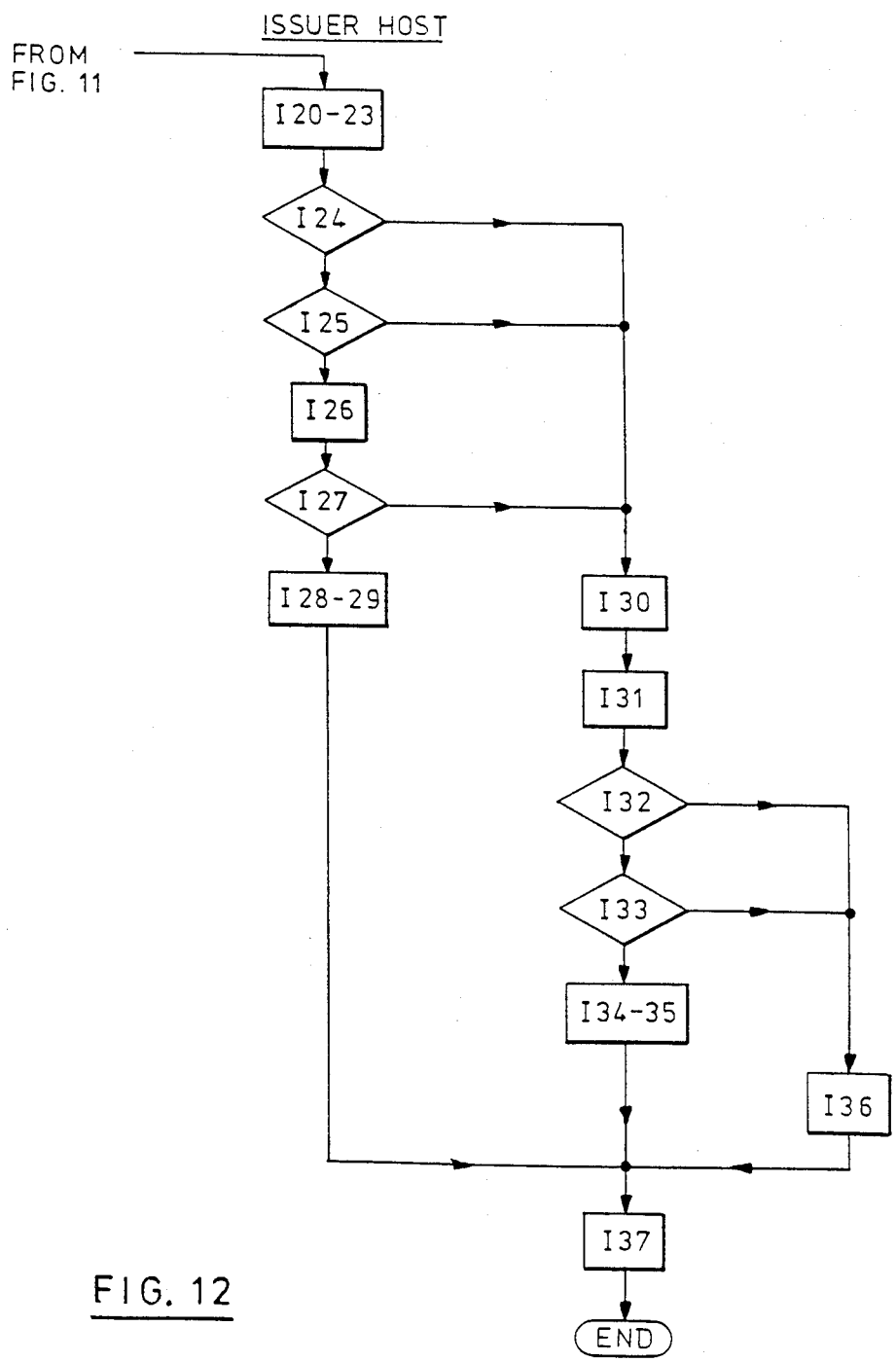

FIGS. 10, 11 and 12 illustrate the sequence of the steps of the method in a flow chart form. Starting with step C1 at the personal portable microprocessor (FIG. 10) the steps continue to I37 (FIG. 12) which ends the transaction.

The system described above has the added advantage in that when the POS terminal is in a supermarket environment the personal verification check which typically should take between 1-5 seconds can be initiated before the goods are totalled and completed well before the total amount due has been calculated. Unless there is some valid reason for referring the user's card there should be no additional delay at the terminal for customers using the EFT system for payment of goods.

We claim:

1. A method of testing the validity of personal identification numbers (PIN) entered into an electronic funds transfer system (EFT) at a terminal connected through a data communication network to a data processing centre in which each user of the EFT system has an intelligent secure bank card on which is stored a personal key (KP) and a personal account number (PAN) and the data processing centre holds a master list of PINs and KPs or a logical function of PINs and KPs indexed by PANs, the method comprising the following steps:

1. generating a first transaction variant (Tterm) at the terminal whenever a transaction is initiated, and transmitting the first transaction variant to the card;
2. transmitting the PAN from the card and the first transaction variant (Tterm) to the data processing centre;
3. generating at the data processing centre a second transaction variant (Tiss) whenever a transaction message is received from a terminal;
4. generating a first transaction authentication parameter (TAP1) dependent upon the logical function of the associated PIN and KP and the first transaction variant (Tterm);
5. generating a second transaction authentication parameter (TAP2) dependent upon the first transaction authentication parameter (TAP1) and the second transaction variant (Tiss);
6. transmitting the second transaction authentication parameter (TAP2) and the second transaction variant (Tiss) to the terminal;
7. receiving from the card holder the PIN at the terminal and transmitting the PIN to the card;
8. generating at the card a first transaction variant authentication parameter based upon a logical combination of the entered PIN and the stored KP and the first transaction variant;
9. transmitting the card generated first transaction variant authentication parameter to the terminal;
10. at the terminal generating a second transaction variant authentication parameter dependent upon the first transaction authentication parameter received from the card and the second transaction variant received from the data processing centre;
11. comparing the terminal generated second transaction authentication parameter with the second transaction authentication parameter received from the data processing centre, a correct comparison indicating that the entered PIN was correct.

2. A method as claimed in claim 1 in which the transaction variant includes a sequence number or time check portion and the data processor returns the transaction variant to the terminal with the transaction variant authentication parameter and the terminal performs a timeliness or sequence check on the returned message.

3. A method of authentication of a personal identification number (PIN) entered by one of a plurality of users at a terminal connected through a data communication network to a data processing center, each user having an intelligent secure card on which is stored a personal key (KP) and a personal account number (PAN) and the data processing center storing a master list of PINs and KPs accessible by PANs, the method comprising the steps of:

generating and storing at the terminal a transaction variant;

transmitting said transaction variant to said card and storing said transaction variant on said card;

transmitting the PAN from said card through said terminal to said data processing center, accompanied by said transaction variant;

generating at said data processing center by a one way encipher function, a transaction variant authentication parameter (TAP) directly dependent upon the PIN, the KP, and the transaction variant;

transmitting the TAP to the terminal and storing the TAP at the terminal;

receiving from said one of the plurality of users, the PIN at the terminal and storing the PIN on said card;

generating at said card a transaction variant authentication parameter (TAPc) directly dependent upon the entered PIN, the stored KP, and the stored transaction variant;

transmitting said TAPc from said card to the terminal and at the terminal comparing the TAP received from said data processing center with the TAPc received from said card, a correct comparison indicating that the entered PIN is valid.

4. A method as claimed in claim 3 in which the transaction variant includes a random or pseudo-random number generated at the card logically combined with a random or pseudo-random number generated at the terminal.

5. A method as claimed in claim 4 in which the transaction variant includes a sequence number or time check portion and the data processor returns the transaction variant to the terminal with the transaction variant authentication parameter and the terminal performs a timeliness or sequence check on the returned message.

6. A method for maintaining secure communications between a user terminal and a central computer, wherein the user knows a memorized personal identification number (PIN) and carries in his possession a user card containing a personal account number (PAN) and a secret personal key value (KP) which remains in said card, the user card containing a microprocessor and a memory capable of communicating with the terminal when the user inserts the card into the terminal, the user initiating a transaction with the central computer by inserting the card in the terminal and entering his PIN number, the terminal including a secret terminal key (KMT) which it shares with the central computer, the method comprising the steps of:

generating a first random number (Tterm) at said terminal and transmitting it to said card to be stored thereon;

transmitting said PAN from said card to said terminal;

transmitting Tterm, PAN, and a terminal ID from said terminal to said central computer;

accessing a first data table stored in said central computer containing paired values of personal keys (KP) and personal identification numbers (PIN) for each authorized user of the system, assessible by said PAN;

generating at said central computer a second random number (Tiss);

generating at said central computer and transmitting to said terminal a centrally generated transaction authentication parameter TAP2 which is a function of Tterm, Tiss, KP and PIN, the values of KP and PIN being produced by said first table in response to said accessing step with said value of PAN;

transmitting from said central computer to said terminal said random numbers Tterm and Tiss, with Tterm enciphered under KMT, said terminal deciphering the enciphered Tterm under KMT and comparing it with the value of Tterm originally generated at the terminal, to insure that the terminal is receiving messages from the true central computer;

inputting by said user his PIN value into said terminal;

transmitting said PIN value from said terminal to said user's card;

generating with said microprocessor on said user's card a card generated transaction authentication parameter TAP1 from the values Tterm, KP and PIN, where the value of KP is provided by said user's card and the value of PIN is provided by said user and transmitting said generated transaction authentication parameter TAP1 to said terminal;

generating on said card a test value transaction authentication parameter TAP2 which is a function of said generated value of TAP1 and the value Tiss and transmitting said test value of TAP2 to said terminal;

comparing in said terminal said centrally generated value of TAP2 from said central computer with said test value of TAP2 from said card;

authorizing said user to carry on his transaction using said card at said terminal with said central computer, if said comparison shows that the value of TAP2 from said central computer equals the value of TAP2 from said card;

denying authorization to said user to carry on a transaction with said card at said terminal to said computer center if said comparison shows that the value of TAP2 from said central computer does not equal the value of TAP2 from said card.

* * * * *